United States Patent [19]

McCoy

[11] 4,140,833
[45] Feb. 20, 1979

[54] SIZE COMPOSITION COMPRISING AN EPOXY RESIN PVP AND A SILANE AND GLASS FIBERS TREATED THEREWITH

[75] Inventor: Richard A. McCoy, Gahanna, Ohio

[73] Assignee: Owens-Corning Fiberglas Corporation, Toledo, Ohio

[21] Appl. No.: 802,848

[22] Filed: Jun. 2, 1977

[51] Int. Cl.$^2$ .................. B32B 17/10; C08L 39/06
[52] U.S. Cl. ..................... 428/392; 260/29.6 NR; 428/273
[58] Field of Search ............ 260/29.6 NR; 428/392, 428/273

[56] References Cited

U.S. PATENT DOCUMENTS

| 3,207,623 | 9/1965 | Marzocchi et al. | 260/29.6 NR |
|---|---|---|---|
| 3,705,073 | 12/1972 | Marzocchi et al. | 428/375 |
| 3,816,235 | 6/1974 | Lin | 428/375 |
| 4,107,118 | 8/1978 | McCoy | 260/29.6 NR |

Primary Examiner—J.C. Cannon
Attorney, Agent, or Firm—Ronald C. Hudgens; Philip R. Cloutier; Dannis M. Kozak

[57] ABSTRACT

A glass size composition comprising an epoxy resin emulsion, a polyvinylpyrrolidone, gamma-methacryloxypropyltriethoxysilane and a polyethylene glycol ester monostearate is particularly suitable for use in continuous pultrusion.

12 Claims, No Drawings

SIZE COMPOSITION COMPRISING AN EPOXY RESIN PVP AND A SILANE AND GLASS FIBERS TREATED THEREWITH

This invention relates to glass fiber size compositions.

More specifically, this invention relates to both an epoxy resin-compatible and a polyester resin-compatible glass fiber size compositions particularly suitable for continuous pultrusion.

The use of glass fibers in continuous pultrusion is well known. Generally, the glass fiber is sized with a material which is compatible with the resin. However, it is also desirable that the glass fiber contribute consistant, high strength to the laminate into which it is incorporated.

The size composition of this invention provides laminates which exhibit excellent mechanical strength properties, especially flexural strength and excellent electrical properties, especially dielectric breakdown voltage.

The size composition of this invention can be applied to any glass fibers by any conventional manner employing conventional applicators. The glass fibers can be dried by conventional procedures, such that the fibers possess, upon drying, a size solids content within the range of from about 0.50 to about 0.65 weight percent as determined by loss on ignition. The fibers can be dried in the form of individual fibers, roving, or the like and accumulated into packages of any size.

According to this invention there is provided an aqueous glass fiber size composition comprising an epoxy resin emulsion, gamma-methacryloxypropyltriethoxysilane, a polyvinylpyrrolidone and a polyethylene glycol ester monostearate. In its preferred form, the size composition will comprise demineralized water.

According to this invention, there is also provided at least one glass fiber having at least a portion of its surface in contact with a residue produced by removing water from an aqueous size composition comprising an epoxy resin emulsion, gamma-methacryloxypropyltriethoxysilane, a polyvinylpyrrolidone, and a polyethylene glycol ester monostearate.

The aqueous size composition will contain from about 4 to about 7 weight percent of an epoxy resin emulsion. In its preferred form, the size composition will contain about 5.4 weight percent of the epoxy resin emulsion.

This emulsion is produced by introducing into a mix tank about 3.5 weight percent of a first condensate of ethylene oxide with hydrophobic bases formed by condensing propylene oxide with propylene glycol. One suitable condensate is "Pluronic L101", available from BASF Wyandotte, Industrial Chemical Group, Wyandotte, Michigan.

To the mix tank are then added about 7.2 weight percent of xylene and about 14 weight percent of acetone-free diacetone alcohol. The temperature of the contents of the mix tank is raised to about 110° F at which temperature about 10.6 weight percent of a second condensate of ethylene oxide with hydrophobic bases formed by condensing propylene oxide with propylene glycol are added.

One suitable second condensate is "Pluronic P-105", available from BASF Wyandotte, Industrial Chemical Group, Wyandotte, Michigan.

The contents of the mix tank is then raised to about 175° F at which temperature an epoxy resin is added in an amount of about 64.5 weight percent.

Any suitable epoxy resin can be used. Preferably, the epoxy resin will be the reaction product of epichlorohydrin and bisphenol-A, this reaction product having the general structure:

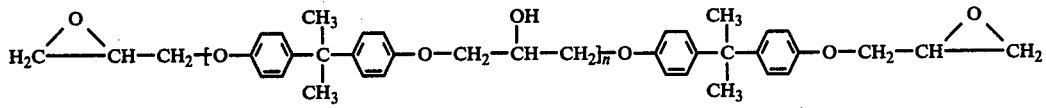

wherein n has a value of less than 7 but such that the resin exists as a solid having an epoxide equivalent weight of between about 575 and about 700, a softening point between about 30 and about 90, and a specific gravity of about 1.19.

Such a material is available as D.E.R. 662 from the Down Chemical Company, Midland, Michigan.

After all the epoxy resin has been added, agitation is continued while the contents of the mix tank are cooled to about 150° F. At this temperature, about 3.5 weight percent of water is added at the rate of about 0.5 weight percent per minute. Cooling and agitation are continued until the temperature of the mix tank reaches about 125° F at which temperature the resin emulsion is maintained for about 5 minutes The resulting emulsion, prepared as described above, shall be referred to hereinafter as the "epoxy resin emulsion."

The glass size composition will contain from about 0.25 to about 0.75 weight percent of gamma-methacryloxypropyltriethoxysilane. In its preferred embodiment, this silane will be contained in the size in an amount of about 0.5 weight percent.

The size composition will also contain a polyvinylpyrrolidone in an amount within the range of from about 0.2 to about 1 weight percent. In its preferred form, the polyvinylpyrrolidone will be contained in an amount of about 0.5 weight percent.

Any suitable polyvinylpyrrolidone can be employed. Preferably, the polyvinylpyrrolidone will have a number average molecular weight of about 360,000 and a viscosity corresponding to PVP K-90 under which grade it is commercially available from several suppliers in the United States. (See Encyclopedia of Chemical Technology, Vol. 21, 2nd ed., John Wiley & Sons, Inc., 1970.)

The aqueous size composition will also contain a polyethylene glycol monostearate in an amount within the range of from about 0.8 to about 2.5 weight percent. In its preferred embodiment, the aqueous size composition will contain the polyethylene glycol monostearate in an amount of about 1.3 weight percent. Preferably, this polyethylene glycol monostearate will have a weight molecular weight of about 400, an acid number of about 4, and a saponification number of about 87.

Suitable polyethylene glycol monostearates are "PEG-400 M. S." from Ethox Chemicals, Inc., Greenville, S.C., and "Trydet SA-9" from Trylon Chemicals, Inc., Maulden, S.C.

The aqueous composition can also contain a lubricant in an amount up to about 0.8 weight percent, preferably in an amount of about 0.55 weight percent. Any suitable lubricant can be employed including partial amides such as "Trylube 7607" as supplied by Trylon Chemicals, Co., Maulden S.C. The aqueous composition can also contain acetic acid in an amount within the range of from about 0.01 to about 0.05 weight percent, preferably in an amount of about 0.03 weight percent.

The following example demonostrates the best mode for the preparation of a 100 gallon quantity of the size composition of this invention.

EXAMPLE I

Into a main mix tank are introduced about 30 gallons of water.

Into a first premix tank are introduced about 45 pounds of the epoxy resin emulsion (previously described) and about 15 gallons of water. The resulting mixture is agitated for about 15 minutes and is introduced into the main mix tank.

Into a second premix tank are introduced about 15 gallons of deionized water, about 0.26 pound of acetic acid, and about 4.3 pounds of gamma-methacryloxypropyltriethoxysilane. The resulting solution is agitated for about 25 minutes and introduced into the main mix tank.

Into a third mix are introduced about 10.8 pounds of polyethylene glycol monostearate (PEG-400 M.S.), about 4.6 pounds of a lubricant (Trylube 7607), about 4 pounds of the polyvinylpyrrolidone, and about 6 gallons of water at a temperature of about 140° F. The resulting solution is agitated until the materials are dispersed and introduced into the main mix tank to produce the size composition of this invention which should have a pH within the range of from about 3.8 to about 4.2 and a solids content of from about 4.5 to about 6.0 weight percent.

Glass strands sized with this size composition can be dried for about 18 hours at 265° f in an indirect or direct gas-fired oven to produce sized glass fibers having a strand solids of about 0.58%, nominal.

The following example demonstrates the properties of glass sized with the size composition of this invention.

EXAMPLE II

The size composition of this invention was applied to a M-450 sliver of E glass at about 0.50 to about 0.65 strand solids. The sized glass was dried for about 18 hours at about 265° F.

Roving was made from the sized fibers and the roving was tested using ASTM D-1491 (Plane to Plane Dielectric Strength). The roving was found to have a dielectric breakdown voltage of 100+ KV when incorporated into an anhydride-epoxy resin having about a 55 ± 5% glass volume after being submerged in 25° C. water for 24 hours.

Roving made from the sized fibers was also incorporated into rods and the rods were evaluated in flexural strength tests with the following results:

| Rod Type | Dry Flexural Strength (psi $\times 10^3$) | 48 hr. Wet Flexural Strength (psi $\times 10^3$) |
| --- | --- | --- |
| polyester | 186.3 | 152.4 |
| anhydride-epoxy | 152.8 | 150.5 |

The above data indicate the excellent dielectric breakdown voltage and the excellent flexural strength of the glass sizing composition of this invention when applied to glass fibers employed for the purpose of reinforcing epoxy and polyester resins.

It will be evident from the foregoing that various modifications can be made to this invention. Such, however, are considered as being within the scope of the invention.

What is claimed is:

1. An aqueous composition comprising an epoxy resin emulsion, gamma-methacryloxypropyltriethoxysilane, a polyvinylpyrrolidone, and a polyethylene glycol ester monostearate.

2. The aqueous composition of claim 1 in which said composition comprises said epoxy resin emulsion in an amount within the range of from about 4 to about 7 weight percent.

3. The aqueous composition of claim 2 in which said epoxy resin of said emulsion comprises the reaction product of epichlorohydrin and bisphenol-A.

4. The aqueous composition of claim 1 in which said composition comprises said gamma-methacryloxypropyltriethoxysilane in an amount within the range of from about 0.25 to about 0.75 weight percent.

5. The aqueous composition of claim 1 in which said composition comprises said polyvinylpyrrolidone in an amount within the range of from about 0.2 to about 2 weight percent.

6. The aqueous composition of claim 1 in which said composition comprises said polyethylene glycol ester monostearate in an amount within the range of from about 0.8 to about 2.5 weight percent.

7. At least one glass fiber having at least a portion of its surface in contact with the residue derived from the aqueous composition of claim 1.

8. The glass fiber of claim 7 in which said aqueous composition comprises said epoxy resin emulsion in an amount within the range of from about 4 to about 7 weight percent.

9. The glass fiber of claim 8 in which said epoxy resin of said emulsion comprises the reaction product of epichlorohydrin and bisphenol-A.

10. The glass fiber of claim 7 in which said aqueous composition comprises said gamma-methacryloxypropyltriethoxysilane in an amount within the range of from about 0.25 to about 0.75 weight percent.

11. The glass fiber of claim 7 in which said aqueous composition comprises said polyvinylpyrrolidone in an amount within the range of from about 0.2 to about 1 weight percent.

12. The glass fiber of claim 7 in which said aqueous composition comprises said polyethylene glycol ester monostearate in an amount within the range of from about 0.8 to about 2.5 weight percent.

* * * * *